United States Patent
Muradov

(10) Patent No.: US 7,803,349 B1
(45) Date of Patent: Sep. 28, 2010

(54) METHOD AND APPARATUS FOR HYDROGEN PRODUCTION FROM WATER

(75) Inventor: Nazim Z. Muradov, Melbourne, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 1153 days.

(21) Appl. No.: 11/445,720

(22) Filed: Jun. 2, 2006

Related U.S. Application Data

(60) Provisional application No. 60/688,866, filed on Jun. 8, 2005.

(51) Int. Cl.
    C01B 3/08 (2006.01)
    C01B 3/26 (2006.01)
(52) U.S. Cl. ...................... 423/657; 423/650
(58) Field of Classification Search ............... 423/657
    See application file for complete search history.

(56) References Cited

U.S. PATENT DOCUMENTS

| | | | |
|---|---|---|---|
| 6,358,488 B1 * | 3/2002 | Suda | 423/657 |
| 6,506,360 B1 | 1/2003 | Andersen et al. | 423/657 |
| 6,534,033 B1 | 3/2003 | Amendola et al. | 423/648.1 |
| 6,683,025 B2 | 1/2004 | Amendola et al. | 502/439 |

(Continued)

FOREIGN PATENT DOCUMENTS

GB 2344110 5/2000

(Continued)

OTHER PUBLICATIONS

Kunio Uehara, et al., "Hydrogen gas generation in the wet cutting of aluminum and its alloys" Journal of Material Processing Technology, vol. 127 (2002) pp. 174-177.

(Continued)

*Primary Examiner*—Melvin C Mayes
*Assistant Examiner*—Kenneth Vaden
(74) *Attorney, Agent, or Firm*—Brian S. Steinberger; Joyce P. Morlin; Law Offices of Brian S. Steinberger, P.A.

(57) ABSTRACT

A method, apparatuses and chemical compositions are provided for producing high purity hydrogen from water. Metals or alloys capable of reacting with water and producing hydrogen in aqueous solutions at ambient conditions are reacted with one or more inorganic hydrides capable of releasing hydrogen in aqueous solutions at ambient conditions, one or more transition metal compounds are used to catalyze the reaction and, optionally, one or more alkali metal-based compounds. The metal or alloy is preferably aluminum. The inorganic hydride is from a family of complex inorganic hydrides; most preferably, $NaBH_4$. The transition metal catalyst is from the groups VIII and IB; preferably, Cu and Fe. The alkali metal-based compounds are preferably NaOH, KOH, and the like. Hydrogen generated has a purity of at least 99.99 vol. % (dry basis), and is used without further purification in all types of fuel cells, including the polymer electrolyte membrane (PEM) fuel cell.

12 Claims, 3 Drawing Sheets

U.S. PATENT DOCUMENTS

| | | | |
|---|---|---|---|
| 2003/0143155 A1 | 7/2003 | Andersen et al. | 423/657 |
| 2004/0018145 A1 | 1/2004 | Suzuki et al. | 423/657 |
| 2004/0115125 A1 | 6/2004 | Andersen et al. | 423/657 |
| 2006/0138996 A1* | 6/2006 | Graham et al. | 320/101 |

FOREIGN PATENT DOCUMENTS

| | | |
|---|---|---|
| JP | 62263946 | 11/1987 |
| SU | 945061 | 7/1982 |
| SU | 1675199 | 9/1991 |
| WO | WO/02/06153 | 1/2002 |
| WO | WO/02/08118 | 1/2002 |
| WO | WO/02/14213 | 2/2002 |
| WO | WO/02/14214 | 2/2002 |
| WO | WO/03/104344 | 12/2003 |
| WO | WO/2004/035464 | 4/2004 |
| WO | WO/2004/052775 | 6/2004 |

OTHER PUBLICATIONS

Belitskus, David, Reaction of Aluminum with Sodium Hydroxide Solution as a Source of Hydrogen, Technical Notes, Journal of Electrochemical Society, vol. 11, No. 8, (1970), pp. 1097-1099.

Abstract Only Matsuyama, Massao, "Hydrogen production from water using waste aluminum," Hydrogen Isot. Res. Cent., Toyama Univ., Toyama Japan, (1992) vol. 12, pp. 49-58

Abstract Only G., Antonini, et al., "Hydrogen generation from concentrated aluminum-water suspensions. Application for continuous heat production by catalytic combustion." Fr. Recents Progres en Genie des Procedes (1991).

Abstract Only Shcherbina, K.G., "Solid-phase reaction products in hydrogen generation processes" Inst. Probl. Mashinostr., Problemy Mashinostroeniya, (1983), vol. 20 pp. 83-86.

* cited by examiner

METHOD AND APPARATUS FOR HYDROGEN PRODUCTION FROM WATER

This invention claims the benefit of priority from U.S. Provisional Patent Application Ser. No. 60/688,866 filed Jun. 8, 2005.

FIELD OF THE INVENTION

The present invention provides a new method and chemical compositions for producing hydrogen from water and methods and apparatuses for using these compositions in energy-related applications, e.g., power generation using fuel cells, heating, etc.

BACKGROUND AND PRIOR ART

Hydrogen is universally considered a fuel of the future due to environmental advantages over conventional (i.e., fossil-based) fuels. Another important advantage of using hydrogen stems from the fact that it could be electrochemically (i.e., without Carnot-cycle limitation) converted into electricity with very high energy conversion efficiency using fuel cells (FC).

To be used in energy conversion devices, hydrogen has to be produced and stored; however, each of these aspects of hydrogen technology is associated with major technological challenges. Conventional (non-electrolytic) hydrogen production processes (for example, steam methane reforming) are complex, multi-stage devices that produce significant amounts of carbon dioxide ($CO_2$) emissions at the production site and, besides, are very difficult to down-scale (e.g., to sub-kilowatt range). Hydrogen storage is another major roadblock to a widespread use of hydrogen in power generation systems. Conventional hydrogen storage systems in the form of a compressed gas, or a liquid, or a metal hydride, suffer from either low gravimetric and volumetric densities, or high cost, or safety-related problems, and the like.

Various methods for generating or producing hydrogen based on the reactions of metal hydrides or metals or their alloys with water are known and are referenced below.

S. Amendola et al. in U.S. Pat. No. 6,534,033 B1 describes a system for hydrogen generation, and in U.S. Pat. No. 6,683,025 B2 describes a process for making hydrogen generation catalysts. Both patents involve a method for storage and controlled release of hydrogen via use of sodium borohydride-based solutions and a catalytic system.

Patent Cooperation Treaty (PCT) publication, WO 2004/035,464 to R. Chen describes hydrogen generation apparatus in which a hydride (stabilized $NaBH_4$) is decomposed by a catalyst to produce hydrogen and waste products.

Methods for producing hydrogen using aluminum and water are disclosed in U.S. Pat. No. 6,506,360 B1 to Andersen et al., PCT publication WO 2002/08118 01 to Andersen et al. entitled, "Hydrogen production from aluminum, water and sodium hydroxide," US Patent Appl. Publ. 2003/0143155 to Andersen et al.; PCT publication WO 2004/052775 to Andersen et al. entitled, "Method for producing hydrogen from aluminum", U.S. Patent Appl. Publ. 2004/0115125 to E. R. Andersen et al. entitled, "Renewable energy carrier system and method." A method and an apparatus for producing hydrogen include reacting aluminum with water in the presence of NaOH as a catalyst. The reaction vessel contains 0.26-19 M aqueous solution of NaOH.

PCT publication WO 02/06153 A1 to E. Baldwin et al. discloses a method of contacting an aqueous liquid (alkali metal hydroxide) with a dissociation initiating material (Al or Na—Al alloys) in a reaction vessel and controlling the surface area of dissociation and pressure therein.

PCT publication WO 2002/14213 A2, to A. Chaklader, et al. discloses a method for producing hydrogen by reacting a metal selected from Al, Mg, Si, Zn with water in the presence of a catalyst at pH between 4 and 10.

U.S. Patent Application Publ. US 2004/0018145 A1, to T. Suzuki et al. discloses a method wherein water and $MgH_2$ react to produce target high-pressure hydrogen in a high-pressure container.

A Japanese patent JP 62263946 to H. Kudo et al. describes the use of quenched aluminum-bismuth alloy for hydrogen production wherein Al—Bi alloy (solidified at >104° C./s) produced hydrogen by dipping in 70° C. water.

A Soviet Union patent, SU 945061 (1982) to L. Kozin et al. disclosed an aluminum-based composition for preparing hydrogen; Al—Hg (3-5 wt. %) alloy was used to produce hydrogen from water.

K. Scherbina in "Solid-phase reaction products in hydrogen generation processes," *Problemy Mashinostroeniya* (1983), v. 20, pp. 83-86 (in Russian) reports that hydrogen was produced by decomposition of water with Al—Li (16%), Al—Li(50%), Al—Na(50%) composites.

Another Soviet Union patent, SU1675199 (1991) to M. Khazin et al. describes the use of aluminum-iron-silicon alloy for producing hydrogen by decomposition of water. The alloy for the efficient production of hydrogen contains Ca (0.1-1%), Na (0.01-1%), Cu (0.1-3%), Fe(5-15%), the balance-Si.

Additional methods for producing hydrogen and heat energy are disclosed by A. Yelkin et al. in PCT publications WO 2003/104344 and WO 2002/14214 A1. The methods consist of preparing a composition based on activated textured aluminum or Al-containing material and reacting it with water. The activation of Al is carried out by means of applying molten fusible metals with low melting point (Ga, Sn, In) to the end surface of Al.

G. Antonini et al. in "Hydrogen generation from concentrated aluminum-water suspensions. Application for continuous heat production by catalytic combustion." *Recents Progres en Genie des Procedes* (1991) 5 (16) pp. 81-86. A process was developed for chemical storage of hydrogen as concentrated suspensions of Al powder in H2O/NaOH. The suspension can be made to produce hydrogen on demand. Hot water for the reaction is taken from a boiler where catalytic combustion of hydrogen is carried out.

M. Matsuyama et al. in "Hydrogen production from water using waste aluminum." *Toyama Daigaku Suiso Doitai Kino Kenkyu Senta Hokoku* (1992) 12, pp. 49-58 discusses factors affecting the rate of hydrogen production from water using Al and Al—Mg alloys were investigated.

In British patent GB 2344110 to G. Carloss, the production of alloy granules for hydrogen generation is discussed. The granules are made from Al, Sn, Zn and trace amounts of Si and Sb. The granules react with hot water with the production of hydrogen gas.

Hydrogen generation is observed in the wet cutting of Al and its alloys due to the reaction between the fresh surface of Al with water as reported by K. Uehara et al. in "Hydrogen gas generation in the wet cutting of aluminum and its alloys" *J. Mater. Proc. Techn.* (2002) 127, pp. 174-177.

Aluminum samples in the form of a cylindrical block, powder or pellets react with aqueous solutions of NaOH to generate hydrogen gas are discussed by D. Belitskus, in "Reaction of aluminum with sodium hydroxide solution as a source of hydrogen," *J. Electrochem. Soc.* (1970) 117, pp. 1097-1099.

It should be noted, however, that the systems based on metal hydrides, and particularly complex metal hydrides, are rather costly and require preliminary preparation of reacting solutions and the use of expensive noble metal based catalysts. Metal-based systems also suffer from a number of shortcomings. Metals or alloys, such as, Li, Na, K, Ca, Al—Hg, Al—Li, Al—Na, Si—Al—Ca—Na—Fe—Cu, that directly react with water at ambient temperature are either expensive, or hazardous, or present great safety concerns, including, violent uncontrolled reaction with water. On the other hand, such inexpensive and readily available materials like aluminum (Al) and its alloys and iron (Fe) and its alloys do not react with water at ambient temperature. Al can release hydrogen from aqueous solutions only in the presence of substances, such as, alkali hydroxides: NaOH, KOH, that remove a protective oxide layer from Al surface and, as a result, are consumed in the process, since they are transformed into respective aluminates.

Thus, there is a need for an efficient, simple and inexpensive hydrogen-generating system and a device that could be easily adopted to different capacities from watts to kilowatt range. There is also a need for a method and an apparatus to safely produce hydrogen using water and other readily available materials in locations where it may be conveniently used for heat and/or electricity generation. There is also a need for more efficient chemical compositions that exceed the performance characteristics, such as, specific energy, power density, of the state-of-the-art hydrogen-generating systems.

The present invention improves upon the deficiencies of the prior art which include, but are not limited to, the following.

The disclosed system has greater power density (i.e., amount of hydrogen produced from unit of weight or volume of the reagents used) compared to prior art. The present invention is simpler and more compact. Hydrogen is produced directly from water, not from reacting solutions of water-soluble hydrides as in prior art. Hydrogen production starts immediately upon the addition of water without any induction or warming-up period. The present invention utilizes inexpensive readily available reagents and catalysts.

SUMMARY OF THE INVENTION

A primary objective of the present invention is to provide a method for producing hydrogen from water and hydrogen-containing compounds.

A secondary objective of the present invention is to provide an apparatus for producing hydrogen from water and hydrogen-containing compounds.

A third objective of the present invention is to provide chemical compositions for producing hydrogen from water and hydrogen-containing compounds.

A fourth objective of the present invention is to provide chemical compositions capable of reacting with water to produce hydrogen at ambient conditions of temperature and pressure.

A fifth objective of the present invention is to provide compounds that catalyze the release of hydrogen from water and hydrogen-containing compounds at ambient conditions of temperature and pressure.

A sixth objective of the present invention is to provide chemical compositions for producing hydrogen from water and hydrogen-containing compounds that are easily disposed of and/or regenerated into original reagents.

A seventh objective of the present invention is to provide a method, apparatus and chemical composition that produces high purity hydrogen gas (>99.9 volume %).

A preferred method for producing hydrogen from water includes selecting at least one metallic ingredient that can release hydrogen when reacting with water, selecting at least one inorganic hydride that can release hydrogen when reacting with water, selecting at least one transition metal compound that can catalyze the reaction of metallic ingredient and inorganic hydride with water, keeping the metallic ingredient and inorganic hydride separate until the reaction with water is desired for the production of hydrogen, placing the metallic ingredient in a first holding area and the inorganic hydride in a second holding area within a vessel without water, adding water to the vessel to cover the holding area with the metallic ingredient and the holding area with the inorganic hydride, and collecting hydrogen released from the decomposition of water in a synergistic reaction of metallic ingredient and inorganic hydride.

The metallic ingredient in the preferred method is selected from elements of groups IIA-IVA and VIII and alloys thereof and preferably include aluminum (Al), magnesium (Mg), silicon (Si), iron, aluminum alloys, magnesium alloys, iron alloys and silicon alloys; most preferably, the metallic ingredient is aluminum.

The preferred inorganic hydride is selected from a family of inorganic complex metal hydrides and includes sodium borohydride, lithium borohydride, potassium borohydride, lithium aluminum hydride, sodium aluminum hydride; most preferably, the inorganic hydride is sodium borohydride.

It is also preferred to add an alkali metal-based compound to the inorganic hydride prior to adding water to the vessel and add a transition metal compound from groups VIII and IB to the metallic ingredient prior to adding water to the vessel to catalyze the aqueous reaction resulting in hydrogen release.

The preferred alkali metal-based compound that is added to the inorganic hydride is at least one of sodium hydroxide (NaOH), potassium hydroxide (KOH), lithium hydroxide (LiOH), sodium carbonate ($Na_2CO_3$), and potassium carbonate ($K_2CO_3$); most preferably the alkali metal-based compound is sodium hydroxide (NaOH).

The preferred transition metal and its compound is cobalt, cobalt chloride ($CoCl_2$), cobalt bromide ($CoBr_2$), cobalt iodide ($CoI_2$), cobalt nitrate ($Co(NO_3)_2$, iron, iron (II) chloride ($FeCl_2$), iron (III) chloride ($FeCl_3$), ruthenium, ruthenium (III) chloride ($RuCl_3$), copper, copper sulfate ($CuSO_4$), platinum, chloroplatinic acid ($H_2PtCl_6$), nickel, nickel nitrate ($Ni(NO_3)_2$ and nickel chloride ($NiCl_2$); most preferably the transition metal compounds are cobalt chloride ($CoCl_2$) and iron chloride ($FeCl_2$).

A preferred composition capable of decomposing water and releasing hydrogen without the need for additional reagents or elevated temperatures contains a separate amount of a metallic ingredient that can release hydrogen when reacting with water in a reaction vessel, a separate amount of an inorganic hydride that can release hydrogen when reacting with water in a reaction vessel, and a separate amount of a transition metal compound that can catalyze the reaction of the metallic ingredient and inorganic hydride with water.

The preferred metallic ingredient in the composition of the present invention is selected from elements of groups IIA-IVA and VIII and alloys thereof, preferably aluminum (Al), magnesium (Mg), silicon (Si), iron (Fe), aluminum alloys, magnesium alloys, iron alloys and silicon alloys; most preferably, the metallic ingredient is aluminum.

The preferred inorganic hydride of the composition of the present invention is selected from a family of complex inorganic hydrides which includes, but is not limited to, sodium borohydride, lithium borohydride, potassium borohydride, lithium aluminum hydride, sodium aluminum hydride; most preferably, the inorganic hydride is sodium borohydride.

The preferred composition of the present invention also includes an alkali metal-based compound added to the inorganic hydride prior to contact with water in a reaction vessel, and a transition metal compound from groups VIII and IB added to the metallic ingredient prior to contact with water in a reaction vessel to catalyze the aqueous reaction resulting in hydrogen release.

The preferred alkali metal-based compound is at least one of sodium hydroxide (NaOH), potassium hydroxide (KOH), lithium hydroxide (LiOH), sodium carbonate ($Na_2CO_3$), and potassium carbonate ($K_2CO_3$); most preferably, the alkali metal-based compound is sodium hydroxide (NaOH).

The preferred transition metal and its compound is cobalt, cobalt chloride ($CoCl_2$), cobalt bromide ($CoBr_2$), cobalt iodide ($CoI_2$), cobalt nitrate ($Co(NO_3)_2$, iron, iron (II) chloride ($FeCl_2$), iron (III) chloride ($FeCl_3$), ruthenium, ruthenium (III) chloride ($RuCl_3$), copper, copper sulfate ($CuSO_4$), platinum, chloroplatinic acid ($H_2PtCl_6$), nickel, nickel nitrate ($Ni(NO_3)_2$ and nickel chloride ($NiCl_2$); most preferably, the transition metal compound is cobalt chloride ($CoCl_2$) and iron chloride ($FeCl_2$).

A preferred apparatus for producing high purity hydrogen from the decomposition of water, is a reaction vessel having a lower part and an upper part, a bellows-shape wall portion forming the upper part of the vessel, a first holding area for a metallic component in the upper part of the vessel, a second holding area for an inorganic hydride in the lower part of the vessel, a rod to support the holding area for the metallic component extending through the upper bellows-shape wall portion to the lower part of the vessel, an inlet for water with a cap integrally attached and protruding upward from the bellows-shape portion of the vessel, an outlet for hydrogen with a valve extending upward from the bellows-shape portion of the vessel, an outlet for a spent solution of reagents used in the reaction to release hydrogen extending downward from the lower part of the reaction vessel, and water to cover the holding area for an inorganic hydride and the holding area for the metallic component that is supported by a rod.

The preferred metallic ingredient is selected from elements of groups IIA-IVA and VIII and alloys thereof which include, but are not limited to, aluminum (Al), magnesium (Mg), silicon (Si), iron (Fe), aluminum alloys, magnesium alloys, iron alloys and silicon alloys; most preferably, the metallic ingredient is aluminum.

The preferred inorganic hydride is selected from a family of complex inorganic hydrides, including, but not limited to, sodium borohydride, lithium borohydride, potassium borohydride, lithium aluminum hydride, sodium aluminum hydride; most preferably the inorganic hydride is sodium borohydride.

Another preferred apparatus for producing high purity hydrogen from the decomposition of water includes a reaction vessel having a first chamber for receiving a plurality of reactant capsules prior to the addition of water to the vessel and a second chamber to accommodate the aqueous reaction water from the first chamber when the reaction is stopped, a piston and tension spring assembly connected to the second chamber to accommodate pressure that builds when the reaction is stopped, a supporting grid to support the plurality of reactant capsules, an inlet for water with a cap integrally attached and protruding upward from the first chamber of the vessel, an outlet for hydrogen with a valve to stop the flow of hydrogen and move the aqueous reaction water to the second chamber, said valve extending upward from the top portion of the vessel, and an outlet for a spent solution of reagents used in the reaction to release hydrogen extending downward from the bottom of the first chamber of the reaction vessel.

One of the plurality of reactant capsules preferably contains an alkali metal-based compound that is at least one of sodium hydroxide (NaOH), potassium hydroxide (KOH), lithium hydroxide (LiOH), sodium carbonate ($Na_2CO_3$), and potassium carbonate ($K_2CO_3$); most preferably, the alkali metal-based compound is sodium hydroxide (NaOH).

Another of the plurality of reactant capsules preferably contains a transition metal and its compound that is at least one of cobalt, cobalt chloride ($CoCl_2$), cobalt bromide ($CoBr_2$), cobalt iodide ($CoI_2$), cobalt nitrate ($Co(NO_3)_2$, iron, iron (II) chloride ($FeCl_2$), iron (III) chloride ($FeCl_3$), ruthenium, ruthenium (III) chloride ($RuCl_3$), copper, copper sulfate ($CuSO_4$), platinum, chloroplatinic acid ($H_2PtCl_6$), nickel, nickel nitrate ($Ni(NO_3)_2$ and nickel chloride ($NiCl_2$); most preferably, the transition metal compound is cobalt chloride ($CoCl_2$) and iron chloride ($FeCl_2$).

The water used for the reaction to release hydrogen includes, but is not limited to, tap water, reclaimed water, industrial grade water, and sea water.

Further objects and advantages of the present invention will be apparent from the following detailed description of a presently preferred embodiment which is illustrated schematically in the accompanying drawings.

DESCRIPTION OF THE PREFERRED EMBODIMENTS

Figure 1:
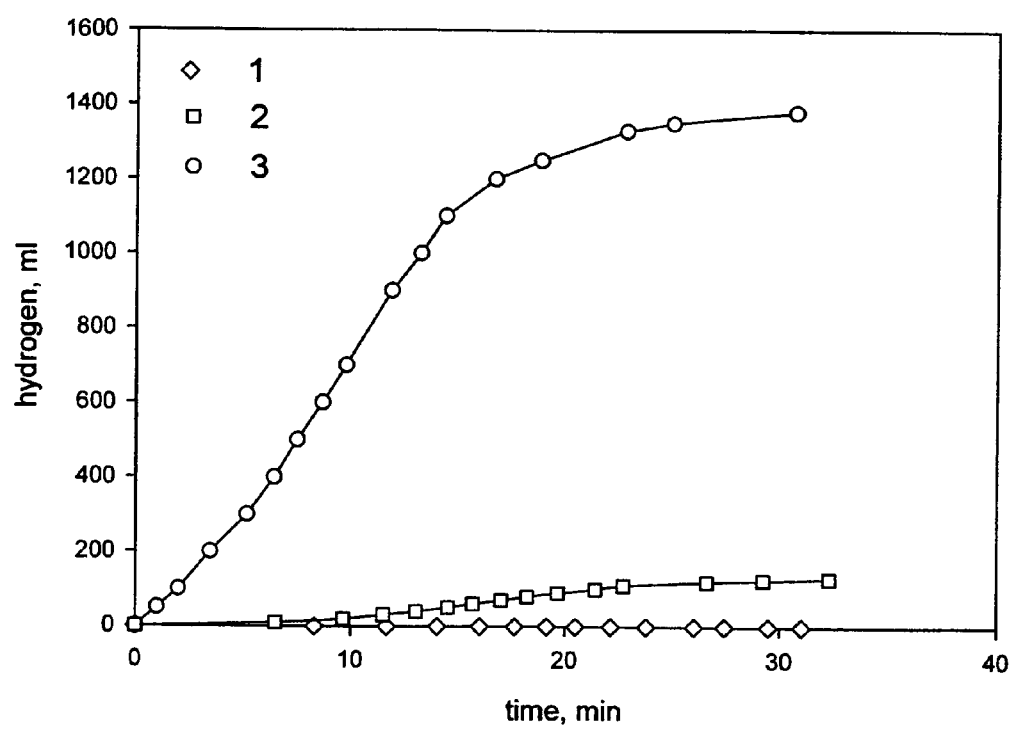
FIG. 1 provides a clear illustration of the synergistic action of the components of the composition during the release of hydrogen from water.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The present invention provides a novel method, apparatuses and chemical compositions for producing hydrogen from water and hydrogen-containing compounds. The new chemical compositions include at least two components: A and B, and, preferably, a third component C, and, optionally, a fourth component D. The component A includes at least one metal or alloy. Although the reaction of the component A with water when producing hydrogen is thermodynamically favorable, it does not occur at ambient conditions of temperature and pressure or slightly elevated temperatures (up to 100° C.) due to a protective oxide layer on the metal or alloy surface. The component B includes one or more inorganic metal hydrides that can release hydrogen in aqueous solutions at ambient conditions in the presence of catalytic materials or without catalytic materials. The composition also includes one or more transition metals or their compounds (the component C) that can catalyze the release of hydrogen and, optionally, one or more alkali metal-based compounds (the component D) to stabilize the component B and accelerate the reaction of the component A with water.

The component A of the composition is selected from the elements of groups IIA-IVA and VIII (e.g., Al, Mg, Si, Fe, etc.), preferably, Al and its common alloys. The component B is selected from a family of inorganic metal hydrides including, but not limited to, $NaBH_4$, $LiBH_4$, $KBH_4$, $LiAlH_4$, $NaAlH_4$, $AlH_3$, preferably, $NaBH_4$. The present invention composition also includes the component C, which is selected from the transition metals and their compounds from the groups VIII and IB including, but not limited to, Co, $CoCl_2$, $CoBr_2$, $CoJ_2$, $Co(NO_3)_2$, Ni, $Ni(NO_3)_2$, $NiCl_2$, Ru, $RuCl_3$, Fe, $FeCl_2$, $FeCl_3$, Pt, $H_2PtCl_6$, Cu, $CuSO_4$, preferably, $CoCl_2$, $FeCl_2$. These compounds may be used in the form of fine powders, thin films deposited on the surface of the component A, or supported on a solid substrate such as $Al_2O_3$, $SiO_2$, activated carbon, molecular sieves, etc, preferably, $Al_2O_3$. The disclosed composition optionally includes the component D, which is selected from alkali metal-based compounds, such as, NaOH, KOH, LiOH, $Na_2CO_3$, $K_2CO_3$, preferably, NaOH.

The hydrogen production method disclosed in the present invention involves adding water to a chemical composition consisting of the components A, B (stored separately before the reaction) and C and, optionally, D mixed at certain ratios at the moment when the release of hydrogen gas is desirable. It should be emphasized that neither component of the composition (except, the component B) is able to react with water to produce hydrogen at room temperature. In some cases, e.g., $NaBH_4$, the component B very slowly reacts with water at ambient temperature. The component C can catalyze the reaction of both components A and B with water. The function of the component D is to stabilize the component B before the reaction (i.e., to prevent slow spontaneous decomposition of B) and also to facilitate the reaction of the component A with water.

The novelty of the invention resides in the synergistic action of the components A and B that lead to a facilitated reaction of both components with water and the release of hydrogen therefrom. Although thermodynamically favorable, the reaction of Al (component A) with water does not occur at room or elevated (up to 100° C.) temperatures without the presence of a special reagent that eliminates the protective oxide layer from its surface. On the other hand, some complex metal hydrides such as sodium borohydride (component B) very slowly react with water at ambient conditions and usually require a catalyst to facilitate the reaction. When mixed together, the components A and B form a novel chemical composition that is able to decompose water and release hydrogen without the need for additional reagents. This becomes possible due to the catalytic action of the component A on the reaction of B with water; at the same time, the component B activates the component A (i.e., Al) by removing oxide layer from its surface and, thus, facilitates its reaction with water. In generalized form, the main reaction can be represented in the form of the following equation:

$$A+B+nH_2O \rightarrow nH_2+(AB)O_n \quad (1)$$

where, $(AB)O_n$ denotes the final product of the transformation of the components A and B in an aqueous solution.

The addition of the component C to the composition accelerates the reactions of both components A and B with water, and, thus facilitates the overall process. It should be noted that the component C is also capable of accelerating the reactions of the components A and B with water separately (i.e., without the presence of a third component, such as B and A, respectively). In a generalized form:

$$A+H_2O+(C) \rightarrow H_2+AO+(C) \quad (2)$$

$$B+H_2O+(C) \rightarrow H_2+BO+(C) \quad (3)$$

where, C is the component C of the chemical composition, and AO and BO denote the final products of the transformation of the components A and B, respectively, in the presence of C in aqueous solutions.

The function of the component D is to stabilize the component B (i.e., to prevent its premature moisture-induced decomposition). Another important role of the component D is to accelerate the reaction of the component A with water by removing the protective oxide layer from its surface. In a general form:

$$A+H_2O+(D) \rightarrow H_2+(AD)O \quad (4)$$

where, D is the component D of the chemical composition, and (AD)O denotes the final product of the transformation of the components A and D in an aqueous solution.

Table 1 below provides a generic composition of the present invention.

TABLE 1

Composition for Hydrogen Production from Water

| Component | Illustrative example of the component | Concentration range, wt. % |
|---|---|---|
| A | Aluminum (Al) | 10-80 |
| B | Sodium borohydride ($NaBH_4$) | 15-75 |
| C | Cobalt chloride ($CoCl_2$) | 0.1-20 |
| D | Sodium hydroxide (NaOH) | 0.5-50 |

Example 1

In a three-part experiment illustrated in FIG. 1, first, 0.27 g of Al foil (the component A) was brought into contact with 100 ml of water: no hydrogen production was observed at 50° C. (curve 1 on FIG. 1). In the second part, 0.38 g $NaBH_4$ (the component B) was stabilized with 0.47 g of NaOH (the component D) and the mixture was added to 100 ml of water at 50° C., which resulted in some slow release of hydrogen gas (curve 2). (It should be noted that adding more NaOH to $NaBH_4$ results in more stabilization of the latter and, hence, even slower release of hydrogen). In the third part of the experiment, 0.27 g of Al foil and (0.38 g) of $NaBH_4$ were brought into contact with water and each other in a vessel (at 50° C.). This resulted in a fast (but controlled) reaction between the components of the mixture and water and led to the energetic release of hydrogen gas from water and the hydride (curve 3). There was unreacted Al foil (0.149 g) remaining in the vessel after 1 hour. The volume of hydrogen produced after one hour was 1,205 ml, which is roughly equal to the sum of stoichiometric volumes of hydrogen that would be generated from Al and $NaBH_4$ if they reacted with water separately (1,141 ml). The purity of hydrogen gas produced exceeded 99.99 vol. % (on dry basis). Hydrogen gas did not contain any harmful contaminants such as carbon monoxide, hydrogen sulfide, ammonia, etc., therefore it was directly fed to polymer electrolyte membrane (PEM) fuel cell to produce electricity.

Example 2

0.27 g of Al powder (component A) was mixed with 0.02 g of $CoCl_2$ (component C) and ground in an agate mortar to form a uniform fine powder. Separately, 0.39 g of $NaBH_4$ (component B) was mixed with 0.22 g of NaOH (component D). The second mixture was added to 100 ml of distilled water at room temperature, followed by adding the first mixture to the resulting solution. An immediate release of hydrogen gas was observed. The amount of hydrogen gas produced was 1.40 liters, which compares favorably within the experimental margin of error (5%) with the stoichiometric amount of hydrogen (1.34 liters).

Figure 2:
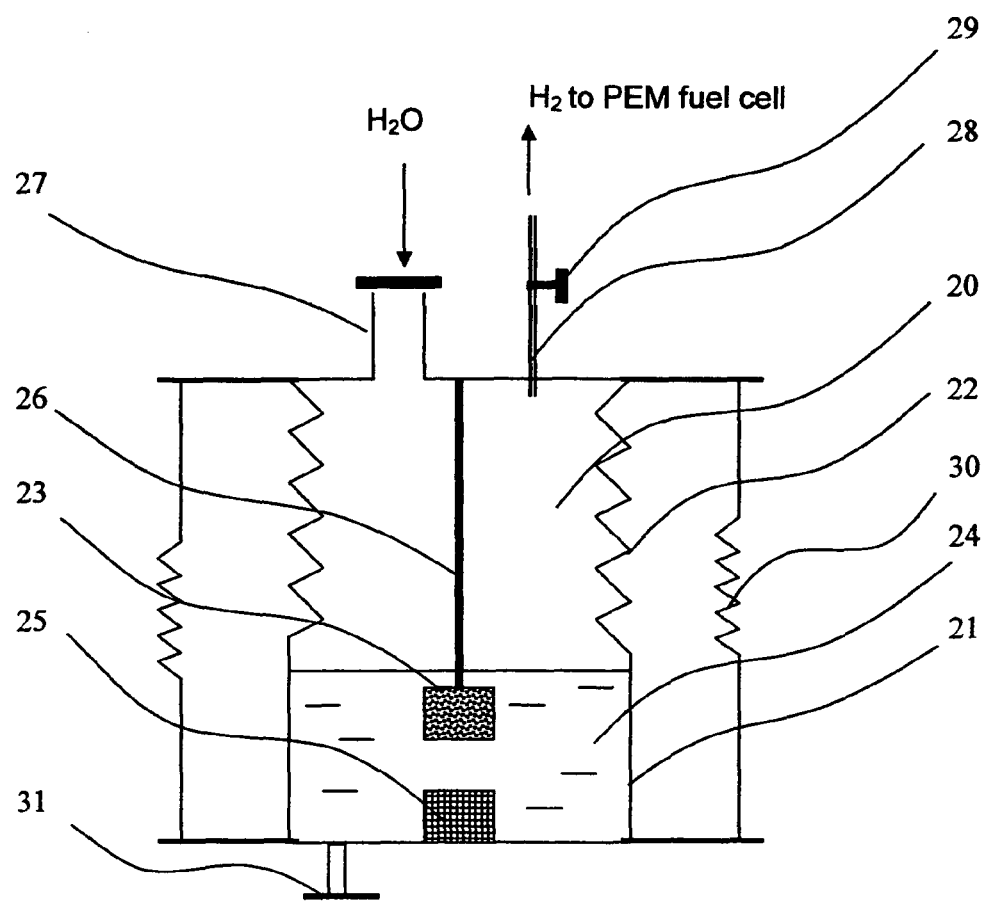
FIG. 2 is an illustration of one preferred embodiment of the apparatus for hydrogen production according to the present invention.

Referring now to FIG. 2, there is an illustration of the apparatus that is preferred for the present invention. However, a judicious selection of apparatus is required by someone skilled in the art and is not a limitation of the present invention. The apparatus 20 consists of two sections: bottom cylindrical part 21 and upper bellow-shaped part 22. The component A or the mixture of A and C is placed in a holder 23 that is attached to the upper section of the vessel by a rod 26. The component B or the mixture of B and D is placed in a holder 25 that is attached to the bottom section of the vessel. When hydrogen is needed, water is introduced into the vessel 20 through the inlet 27. Water dissolves the component B (or B plus D) in holder 25, and the resulting solution reacts with the component A (or A plus C) in holder 23 with the release of hydrogen gas from water and the component B. Hydrogen gas exits the vessel through an outlet 28 having a valve 29. When hydrogen is no longer needed, the valve 29 is closed, causing pressure in the vessel to increase and expand the bellow-shape section the vessel 22 upward. The holder 23 with the component A is drawn out of the reacting solution 24 and the hydrogen generation reaction stops. Hydrogen pressure in the exit line is regulated by the tension of a plurality of springs 30. The waste solution, after depletion of the components A and B, is withdrawn from the vessel through an outlet 31. Since the purity of hydrogen gas produced exceeds 99.99 vol. % (on dry basis), and it does not contain any potentially harmful contaminants such as carbon monoxide, hydrogen sulfide, ammonia, and the like; hydrogen can be directly fed to any type of fuel cell, including PEM fuel cell, to produce electricity.

Figure 3:
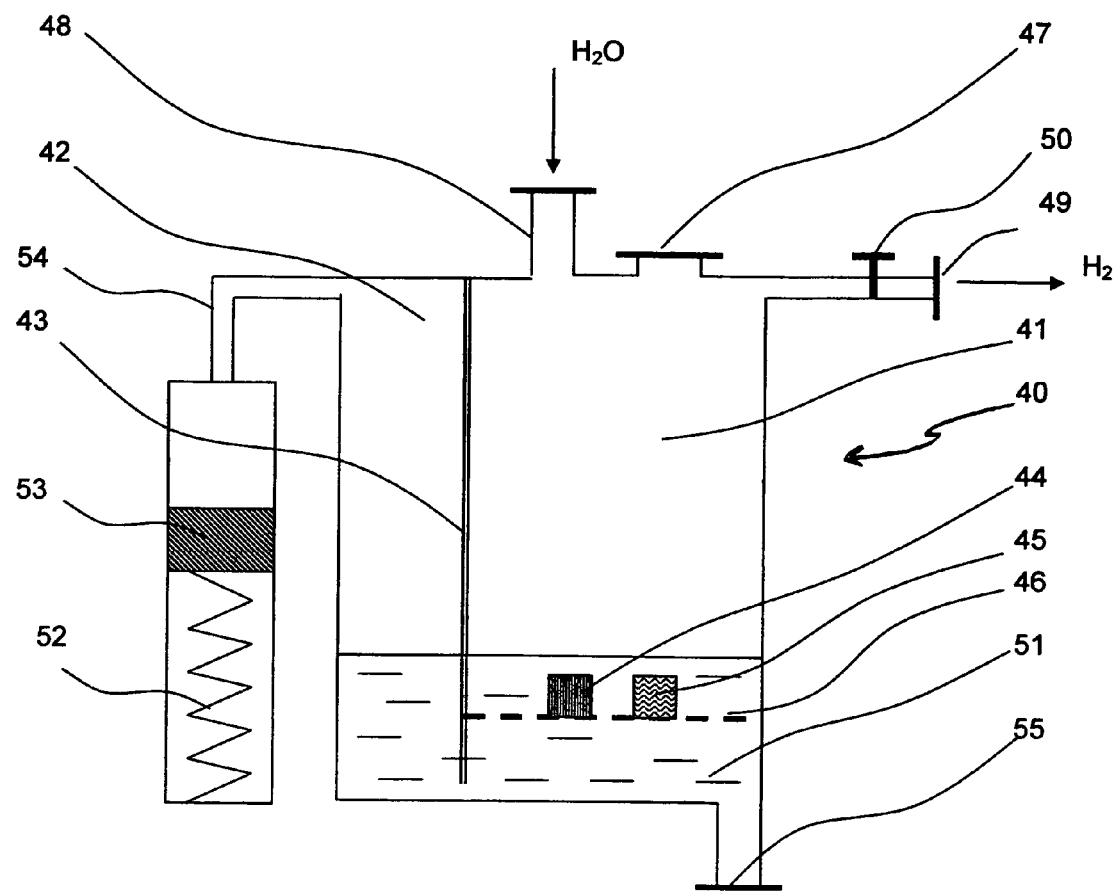
FIG. 3 is an illustration of the second preferred embodiment of the apparatus for hydrogen production according to the present invention.

FIG. 3 depicts another preferred embodiment of the inventive apparatus. The apparatus 40 consists of two chambers 41 and 42 divided by a partition 43. The components A (or A plus C) and B (or B plus D) are placed in two separate capsules 44 and 45, respectively. Reactant capsules 44 and 45 each have water-dissolving polymeric jackets. Both capsules are dropped on a grid 46 through a lid 47. When hydrogen is needed, water is introduced into the vessel 40 through an inlet 48 causing the reaction between the components of the composition to start and release hydrogen gas that exits through an outlet 49. By closing the valve 50, the operator stops the flow of hydrogen and simultaneously pushes the reacting solution 51 from the chamber 41 into the chamber 42, and the reaction ceases. The pressure of hydrogen in the exit line is controlled by the tension of a spring 52 in a piston 53 connected to the chamber 42 through a tubing 54. A waste solution can be dislodged from an outlet 55. FIG. 3 depicts the apparatus operating in a hydrogen production mode. Since the purity of hydrogen gas produced exceeds 99.99 vol. % (on dry basis), and it does not contain any potentially harmful contaminants such as carbon monoxide, hydrogen sulfide, ammonia, and the like; hydrogen can be directly fed to any type of fuel cell, including PEM fuel cell, to produce electricity.

The advantages of the present invention over known methods for generating or producing hydrogen from water, include, but are not limited to, the elimination of a need for a preliminary preparation of reacting solutions and the direct production of hydrogen from water; the variety of sources of water can include tap, reclaimed, industrial grade water and, even, seawater; inexpensive and readily available reagents and materials are used; hydrogen gas release occurs immediately upon adding water to the chemical composition and does not require pre-heating, mechanical activation or other ways of initiating the reaction.

The specific energy and power density characteristics of the system are superior to state-of-the-art systems due to the use of the combination of two high-energy content components (i.e., components A and B) of the disclosed chemical composition. The release of hydrogen gas starts immediately upon the addition of water without any induction or warming-up period that are required by state-of-the-art systems.

The preferred temperature range of the hydrogen releasing reaction (50-80° C.) is compatible with that of a power-generating system, e.g., a polymer electrolyte membrane (PEM) fuel cell. The reagents and the reaction products used in the method can be safely handled during the operation, and they are safe to humans, animals and environment.

The reaction products are easily disposable and could be recycled into original reagents in a specialized facility. For example, metallic aluminum could be easily regenerated from the reaction products by conventional electrolytic and carbothermic processes.

Five possible uses of the present invention include, but are not limited to, the following applications. The present invention can be used in the production of high purity hydrogen gas (>99.9 vol. %, not accounting for water vapor) with no potentially harmful impurities such as CO, $H_2S$, HCl, unsaturated and aromatic hydrocarbons, and the like.

The present invention can supply hydrogen for electric power generation via use of a fuel cell, preferably, a polymer electrolyte membrane (PEM) fuel cell, or other means of power production including turbines, internal combustion engines, diesel engines and the like.

The present invention provides a combined heat and power supply for residential and industrial applications can be provided when using the method of the present invention.

The present invention can be used in high-power density portable and miniature power systems for electronics and uninterrupted power supply (UPS) units.

The present invention can make hydrogen available for space and military applications, including soldier power supply, unmanned aerial vehicles, air-independent propulsion for submarines, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method for producing hydrogen from water comprising the steps of:
   a) selecting a vessel without water consisting of a first holding area for at least one metallic ingredient that can release hydrogen when reacting with water and a second holding area for
   at least one inorganic hydride that can release hydrogen when reacting with water;
   b) placing the metallic ingredient in the first holding area and the inorganic hydride in the second holding area within the vessel without water;
   c) keeping the metallic ingredient and inorganic hydride separate until the reaction with water is desired for the production of hydrogen;
   d) adding to the metallic ingredient at least one transition metal compound that can catalyze the reaction of the metallic ingredient and the inorganic hydride wherein the addition of the transition metal compound is prior to adding water;

e) adding water to the vessel to cover the first holding area with the metallic ingredient-transition metal combination and the second holding area with the inorganic hydride; and f) collecting hydrogen released from the decomposition of water in a synergistic aqueous reaction of metallic ingredient and inorganic hydride at ambient conditions of temperature and pressure.

2. The method of claim 1, wherein the metallic ingredient is selected from elements of groups IIA-IVA and VIII and alloys thereof.

3. The method of claim 2, wherein the metallic ingredient is selected from the group consisting of aluminum (Al), magnesium (Mg), silicon (Si), iron, aluminum alloys, magnesium alloys, iron alloys and silicon alloys.

4. The method of claim 2, wherein the metallic ingredient is aluminum.

5. The method of claim 1, wherein the inorganic hydride is selected from a family of inorganic complex metal hydrides.

6. The method of claim 5, wherein the inorganic hydride is selected from a group consisting of sodium borohydride, lithium borohydride, potassium borohydride, lithium aluminum hydride, sodium aluminum hydride.

7. The method of claim 6, wherein the inorganic hydride is sodium borohydride.

8. The method of claim 1, further comprising the steps of:

adding an alkali metal-based compound to the inorganic hydride to stabilize the inorganic hydride prior to adding water to the vessel; and adding a transition metal compound from groups VIII and IB to the metallic ingredient prior to adding water to the vessel to catalyze the synergistic aqueous reaction resulting in hydrogen release.

9. The method of claim 8, wherein the alkali metal-based compound is at least one of sodium hydroxide (NaOH), potassium hydroxide (KOH), lithium hydroxide (LiOH), sodium carbonate ($Na_2CO_3$), and potassium carbonate ($K_2CO_3$).

10. The method of claim 9, wherein the alkali metal-based compound is sodium hydroxide (NaOH).

11. The method of claim 8, wherein the transition metal and its compound is cobalt, cobalt chloride ($CoCl_2$), cobalt bromide ($CoBr_2$), cobalt iodide ($CoI_2$), cobalt nitrate ($Co(NO_3)_2$, iron, iron (II) chloride ($FeCl_2$), iron (III) chloride ($FeCl_3$), ruthenium, ruthenium (III) chloride ($RuCl_3$), copper, copper sulfate ($CuSO_4$), platinum, chloroplatinic acid ($H_2PtCl_6$), nickel, nickel nitrate ($Ni(NO_3)_2$ and nickel chloride ($NiCl_2$).

12. The method of claim 11, wherein the transition metal compounds are cobalt chloride ($CoCl_2$) and iron chloride ($FeCl_2$).

* * * * *

UNITED STATES PATENT AND TRADEMARK OFFICE
CERTIFICATE OF CORRECTION

| | | |
|---|---|---|
| PATENT NO. | : 7,803,349 B1 | Page 1 of 1 |
| APPLICATION NO. | : 11/445720 | |
| DATED | : September 28, 2010 | |
| INVENTOR(S) | : Nazim Z. Muradov | |

It is certified that error appears in the above-identified patent and that said Letters Patent is hereby corrected as shown below:

Col. 1, line 14, insert:

--STATEMENT REGARDING FEDERALLY SPONSORED RESEARCH OR DEVELOPMENT

This subject invention was made with government support under NASA, federal contract number NAG3-2751. The government has certain rights in this invention.--

Signed and Sealed this
Eighth Day of March, 2011

David J. Kappos
*Director of the United States Patent and Trademark Office*